Feb. 7, 1939.　　　P. R. LIPTAK　　　2,145,987
CONVERTIBLE AUTOMOBILE SEAT
Filed April 13, 1937
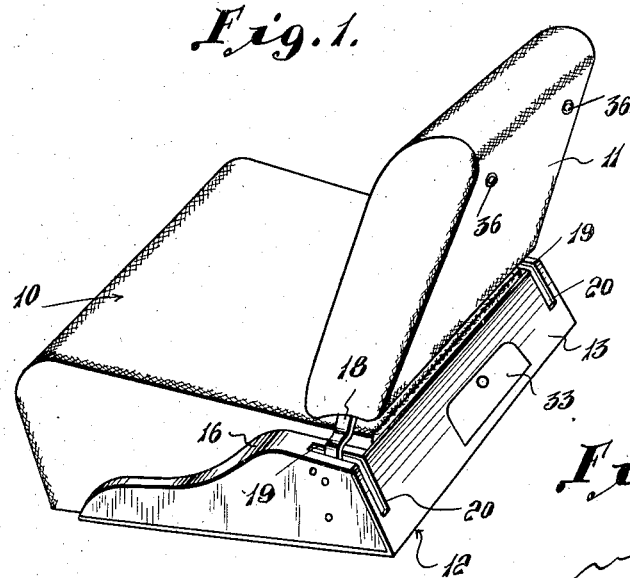
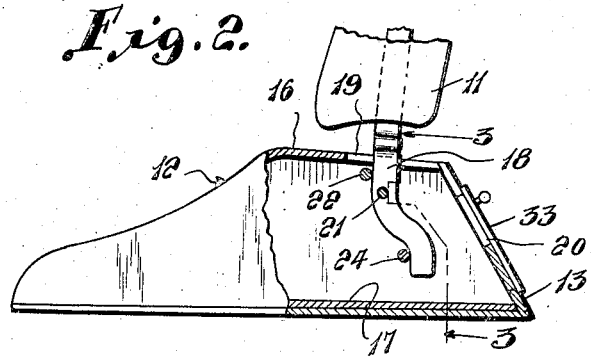
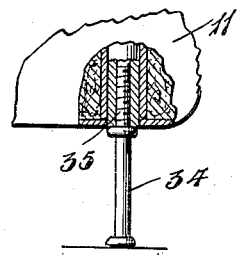
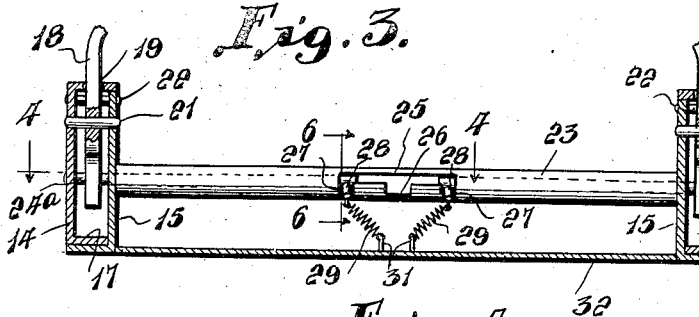
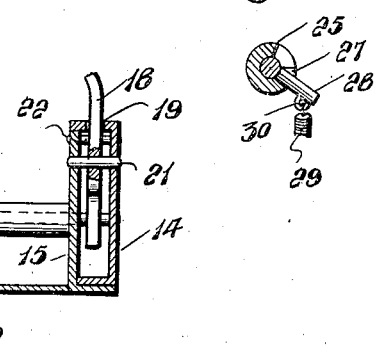
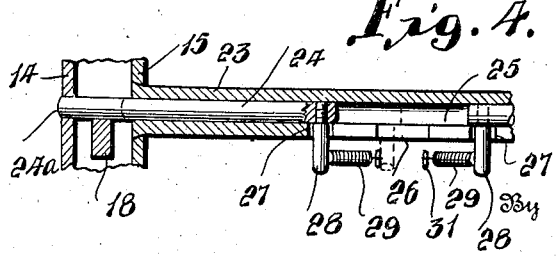
Inventor
P. R. Liptak
Bryant & Lowry
Attorneys Patented Feb. 7, 1939

2,145,987

UNITED STATES PATENT OFFICE 2,145,987

CONVERTIBLE AUTOMOBILE SEAT

Peter R. Liptak, Tonawanda, N. Y.

Application April 13, 1937, Serial No. 136,697

5 Claims. (Cl. 155—7)

This invention relates to certain new and useful improvements in convertible automobile seats.

The primary object of the invention is to provide a convertible automobile seat wherein the back portion of the front seat of an automobile may be swung rearwardly and downwardly substantially into alignment with the front seat to provide a bed structure.

A further object of the invention is to provide a folding back for the front seat of an automobile wherein the back may be unitary or of a sectional character with the back lowered as a unit or either section thereof lowered into a bed arrangement.

A still further object of the invention is to provide a convertible automobile seat wherein the back of the seat may be lowered into the general plane of the seat with a novel arrangement of latch rod carried by the base of the seat and engageable with arms of the back for holding the latter in upright seat formation.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a perspective view of an automobile seat equipped with a convertible back that is adapted to be lowered to a substantially horizontal position into the general plane of the seat;

Figure 2 is a fragmentary side elevational view, partly broken away and shown in section with the seat cushion removed and illustrating the sliding latch rods engaged with the pivotally mounted side arms of the seat back for holding the latter in an upright position and means for limiting forward swinging movement of the back;

Figure 3 is a vertical cross-sectional view taken on line 3—3 of Figure 2, showing the tubular member carried by the seat frame in which the sliding latch rods are mounted with the spring devices associated with the latch rods for holding them in position;

Figure 4 is a detail sectional view taken on line 4—4 of Figure 3, with one of the tensioned latch rods illustrated by dotted lines in its retracted inoperative position;

Figure 5 is a fragmentary elevational view, partly in section of the seat back in lowered position and showing a supporting leg for the upper free swinging edge of the seat back; and Figure 6 is a cross-sectional view taken on line 6—6 of Figure 3, showing the angle end of a latch rod engaged in a notch in the side wall of a slot in the guide tube for the latch rod.

Referring more in detail to the accompanying drawing, the reference character 10 designates a seat cushion provided with a seat back 11, both of which are associated with a seat frame designated in general by the reference character 12.

The seat frame 12 comprises a rear wall 13 having a casing projecting forwardly thereof at each end that is formed of spaced parallel side walls 14 and 15, a top wall 16 and a bottom wall 17, the seat cushion 10 being positioned between the end casings and rear wall 13 of the seat frame.

A side arm 18 depends from the lower end of each side of the seat back 11 and extends downwardly through a slot 19 in the wall 16 of the side casing, the slot 19 extending downwardly through the rear wall 13 of the seat frame as at 20 and through which the arms 18 of the seat back are adapted to move. The side arms 18 of the seat back are pivotally supported on pins 21 extending between the side walls 14 and 15 of the casing. To limit forward swinging movement of the seat back 11, a stop pin 22 extends between the side walls 14 and 15 of the casing forwardly of the arm 18 above the pivot pin 21, and these stop pins 22 may be positioned to permit limited forward swinging movement of the seat back beyond the normal position of rest thereof, such seat construction being found in closed automobiles of the two-door type.

The devices for holding the seat back 11 in its upright position of rest includes latch rods carried by the seat frame 12 adapted to be projected across each side casing of the seat frame forwardly of the lower ends of the side arms 18 of the seat back below the pivot pins 21, the latch rods and mounting therefor including a guide tube 23 supported at its ends in the side walls 15 of the seat frame casing as shown in Figure 4. A latch rod 24 is slidably mounted in each end of the tube 23, the outer end of the latch rod adapted to be extended across the casing between the side walls 14 and 15 and in the path of movement of the lower end of a side arm 18 of the seat back with the outer terminal end 24a of the latch rod supported in an opening in the wall 14 of the casing when the latch rod is in its fully extended position. A longitudinal slot 25 is formed in the guide tube 23 intermediate the ends thereof and one side wall of the slot 25 has an intermediate notch 26 and end notches 27. A pin 28 having threaded or other engagement with the inner end of each latch rod 24 extends at right angles from said latch rod and projects through the slotted opening 25. As shown in Figures 3 and 4, a coil spring 29 has one end thereof anchored as at 30 to the outer end of a pin 28 and the other end of said spring is anchored as at 31 to the bottom wall 32 of the seat frame. The springs 29 act to hold the pins 28 in the selected notches 26 and 27 to prevent accidental sliding movement of the latch rod 24. Access to the latch rod may be had through an opening in the rear wall 13 of the seat frame that is enclosed by a door 33 shown in Figures 1 and 2.

When the seat back 11 is in its lowered position of bed arrangement, a leg 34, as shown in Figure 5, has a threaded end 35 engaged in a threaded socket 36 formed in each corner of the seat back 11 adjacent the upper end thereof.

From the above detailed description of the invention, it is believed that the construction and operation thereof will at once be apparent, it being noted that when the seat back is in its upright position of rest as shown in Figures 1 and 2, the latch rods 24 are extended as shown in Figures 3 and 4 with the outer ends of the latch rods positioned forwardly of the lower ends of the side arms 18 of the seat back to hold the latter in its upright position of rest, the pins 28 at the inner ends of the latch rods being retained in the notches 27 in the guide tube 23 by means of the springs 29 to prevent accidental sliding movement of the latch rods. When it is desired to lower the seat back into bed formation, the door 33 is removed and each pin 28 is removed from its notch 27 and moved through the slot 25 for positioning in the intermediate notch 26, this sliding movement of the latch rod disengaging the outer end thereof from the lower end of the side arm 18 of the seat back whereupon the latter may be lowered to a substantially horizontal position for bed formation and supported by the legs 34 that are threaded into the sockets 36 in the seat back 11. The stop pins 22 limit forward swinging movement of the seat back. Although the invention has been described as associated with automobiles, it is to be noted that the same may form a part of a vehicle of any character.

While there is herein shown and described the preferred embodiment of the invention, it is nevertheless to be understood that minor changes may be made therein without departing from the spirit and scope of the invention as claimed.

I claim:

1. In a convertible vehicle seat, a seat frame, a seat back having side arms pivotally mounted in the frame, means carried by the frame and adapted to be engaged by the side arms at points above the pivots of the latter for limiting forward pivotal movement of the seat back and means slidably mounted transversely of the frame and movable into the forward path of movement of the lower ends of the side arms for holding the seat back in an upright position of rest.

2. In a convertible automobile seat, a seat frame, a seat back having side arms pivotally mounted in the frame, means carried by the frame and positioned to be engaged by the side arms above the side arm pivots for limiting forward pivotal movement of the seat back and means movably carried by the frame and movable into the forward path of movement of the lower ends of side arms for holding the seat back in an upright position of rest.

3. In a convertible automobile seat, a seat frame, a seat back having side arms pivotally mounted in the frame, means carried by the frame and positioned to be engaged by the side arms above the side arm pivots for limiting forward pivotal movement of the seat back and means movably carried by the frame and movable into the path of movement of the side arms, at points below and forwardly of the side arm pivots for holding the seat back in an upright position of rest, said first named means being positioned relative to said second named means and the pivotal mountings of said side arms whereby the side arms when engaged with said second named means may be moved forwardly into engagement with said first named means, said second named means including a guide tube having a longitudinal slot intermediate its ends, a latch rod slidable in each end of the tube with the outer ends of the latch rods engageable with the seat back arms, and an angle pin at the inner end of each rod extending outwardly of the tube slot to facilitate manual operation of the latch rods, one side wall of the tube slot being notched at each end and notched intermediate the ends for reception of the angle pins on the latch rods and a pair of springs exteriorly of the guide tube respectively attached at one end to a pin with the other end attached to the seat frame for holding the pins in selected notches.

4. In a convertible vehicle seat, a seat frame, a seat back having side arms pivotally mounted in the frame, and separate stop means adapted to be engaged by the forward sides of the side arms respectively above and below the horizontal planes of the pivots of said arms for holding the seat back in upright position the stop means above the pivots being disposed to permit limited forward movements of the side arms and seat back.

5. In a convertible vehicle seat, a seat frame, a seat back having side arms pivotally mounted in the frame, and separate stop means adapted to be engaged by the forward sides of the side arms respectively above and below the horizontal planes of the pivots of said arms for holding the seat back in upright position, the stop means above the arm pivots being permanently and rigidly mounted on the frame and the other stop means being slidable transversely of the frame whereby the seat back may be lowered to a substantially horizontal position the stop means above the pivots being disposed to permit limited forward movements of the side arms and seat back.

PETER R. LIPTAK.